(12) United States Patent
Tamura

US012251945B2

(10) Patent No.: US 12,251,945 B2
(45) Date of Patent: Mar. 18, 2025

(54) PRINTER DEVICE

(71) Applicant: TOSHIBA TEC KABUSHIKI KAISHA, Tokyo (JP)

(72) Inventor: Toshiyuki Tamura, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 17/863,442

(22) Filed: Jul. 13, 2022

(65) Prior Publication Data

US 2023/0150284 A1 May 18, 2023

(30) Foreign Application Priority Data

Nov. 17, 2021 (JP) ................................ 2021-187077

(51) Int. Cl.
*B41J 11/00* (2006.01)
*B41J 2/44* (2006.01)
(Continued)

(52) U.S. Cl.
CPC ............... *B41J 29/393* (2013.01); *B41J 2/44* (2013.01); *B41J 3/4075* (2013.01); *B41J 2203/01* (2020.08)

(58) Field of Classification Search
CPC .. B41J 3/4075; B41J 2203/01; B41J 11/0095; B41J 29/393
See application file for complete search history.

(56) References Cited

U.S. PATENT DOCUMENTS

| | | | | |
|---|---|---|---|---|
| 2006/0171754 A1* | 8/2006 | Takami | .................. | B41J 11/006 400/613 |
| 2016/0052316 A1* | 2/2016 | Todaka | .................. | B41J 3/4075 347/188 |

(Continued)

FOREIGN PATENT DOCUMENTS

| | | | |
|---|---|---|---|
| CN | 107757150 | 3/2018 | |
| CN | 107757150 A * | 3/2018 | .............. B41J 29/38 |

(Continued)

OTHER PUBLICATIONS

Wang, Machine TranslationofCN-107757150-A, 2018 (Year: 2018).*
(Continued)

*Primary Examiner* — Scott A Richmond
(74) *Attorney, Agent, or Firm* — Amin, Turocy & Watson, LLP

(57) ABSTRACT

According to one embodiment, the label printer includes a light irradiation unit that irradiates an area illuminated by external light where a label on which printing is completed exists with light, a light irradiation control unit that switches between light irradiation and non-irradiation by the light irradiation unit, a light receiving unit that acquires an optical signal from the area where the label on which printing is completed exists in synchronization with the light irradiation and non-irradiation by the light irradiation control unit, and a label presence or absence determination unit that determines the presence or absence of a label based on a first signal acquired by the light-receiving unit if the light irradiation unit is not emitting light and a second signal acquired by the light receiving unit if the light irradiation unit is emitting light.

20 Claims, 11 Drawing Sheets

(51) Int. Cl.
*B41J 3/407* (2006.01)
*B41J 29/393* (2006.01)

(56) References Cited

U.S. PATENT DOCUMENTS

| | | | | |
|---|---|---|---|---|
| 2019/0064720 | A1* | 2/2019 | Kamei | G03G 15/607 |
| 2020/0407098 | A1 | 12/2020 | Nishiyama | |

FOREIGN PATENT DOCUMENTS

| | | |
|---|---|---|
| JP | 2012-171711 | 9/2012 |
| JP | 2016-49732 | 4/2016 |

OTHER PUBLICATIONS

Extended European Search Report for European Patent Application No. 22194463.0 dated Apr. 12, 2023.
Chinese Office Action for Chinese Patent Application No. 202210973058.9 dated Oct. 26, 2024.

* cited by examiner

PRINTER DEVICE

CROSS-REFERENCE TO RELATED APPLICATION

This application is based upon and claims the benefit of priority from Japanese Patent Application No. 2021-187077, filed on Nov. 17, 2021, the entire contents of which are incorporated herein by reference.

FIELD

Embodiments described herein relate generally to a printer device and methods related thereto.

BACKGROUND

A printer device that prints on the label paper discharges the label separated from release paper by a release unit. A release sensor that detects presence or absence of a printed label may be installed on the holding member that holds the discharged label (. The release sensor is composed of an inexpensive optical sensor and is installed on the outside of the housing of a label printer together with the holding member that holds the discharged label.

In such a printer device, since the release sensor is easily affected by external light, there is a possibility of erroneously detecting presence or absence of a label.

DETAILED DESCRIPTION

An aspect to be solved by exemplary embodiments is to provide a printer device capable of reliably detecting the presence of a printed label even if the printed label is at a position illuminated by external light.

In general, according to one embodiment, the printer device includes a light irradiation unit, a light irradiation control unit, a light receiving unit, and a label presence or absence determination unit. The light irradiation unit irradiates the area illuminated by the external light where a label on which printing is completed exists with light. The light irradiation control unit switches between light irradiation and non-irradiation by the light irradiation unit. The light receiving unit acquires an optical signal from the area where the label on which printing is completed exists in synchronization with the light irradiation and non-irradiation by the light irradiation control unit. The label presence or absence determination unit determines the presence or absence of a label based on a first signal acquired by the light receiving unit if the light irradiation unit is not emitting light, and a second signal acquired by the light receiving unit if the light irradiation unit is emitting light.

First Embodiment

Hereinafter, a first embodiment of a label printer according to the exemplary embodiment will be described in detail with reference to the accompanying drawings.

Overall Configuration of Label Printer

Figure 1:
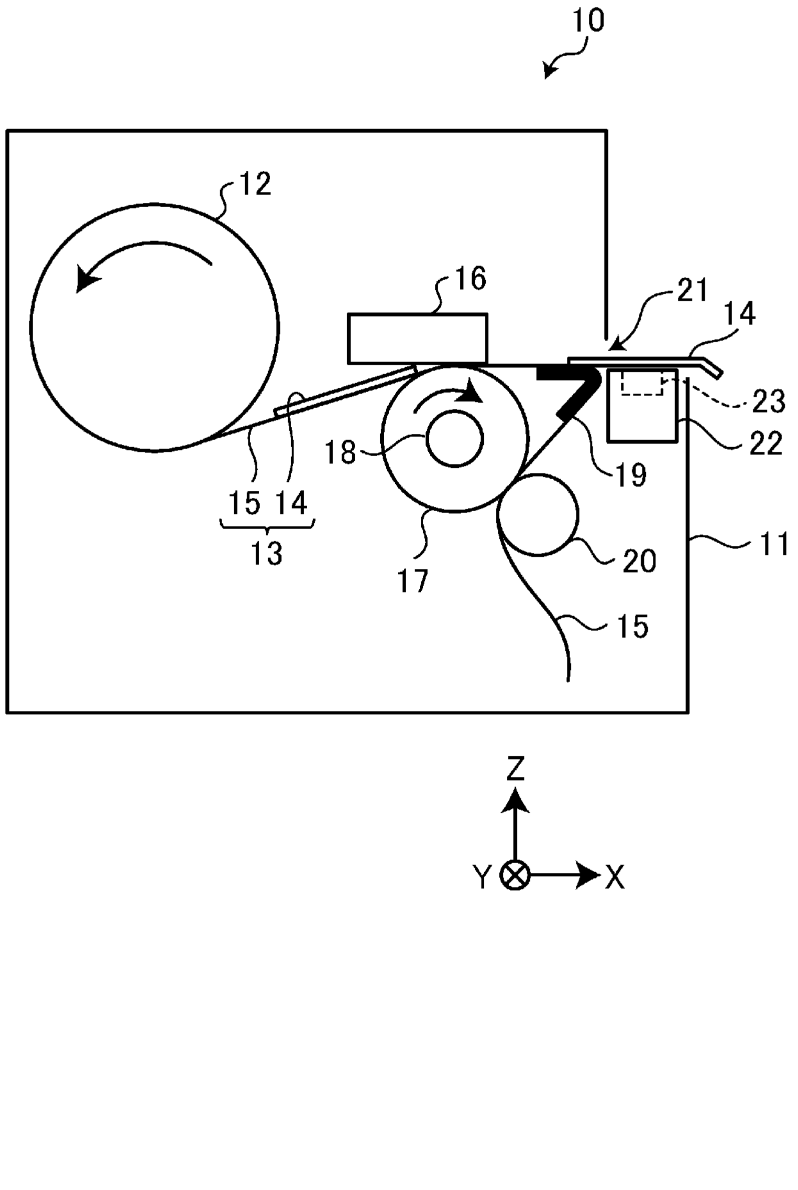
FIG. 1 is a diagram showing an example of a schematic structure of a label printer according to a first embodiment.

A schematic configuration of a label printer 10 according to the first embodiment will be described with reference to FIG. 1. FIG. 1 is a diagram showing an example of a schematic structure of the label printer 10 according to the first embodiment. The label printer 10 is an example of the printer device in the present disclosure.

The label printer 10 includes a label roll 12 in which label paper 13, which is an example of printing paper, is wound in a roll shape inside a housing 11. Then, the label printer 10 prints while pulling out the label paper 13 from the label roll 12.

The label paper 13 is wound in a roll shape with a label 14 attached to release paper 15. The label paper 13 pulled out from the label roll 12 is conveyed toward a discharge port 21 in a state of being sandwiched between a platen roller 17 and a thermal head 16. At this time, the label 14 which is the printing surface is located on the thermal head 16 side. The platen roller 17 is rotationally driven by a drive motor 18 such as a stepping motor.

The thermal head 16 has a structure in which a plurality of heating elements are arranged, and by making the heating elements corresponding to the printing pattern generate heat, printing is performed on the label 14 sandwiched between the thermal head 16 and the platen roller 17. The label printer 10 may be a type of performing printing by sandwiching an ink ribbon (not shown) between the thermal head 16 and the label 14 and transferring the ink of the ink ribbon heated by the thermal head 16 to the label 14.

The back surface side of the label 14 is an adhesive layer and the label 14 is attached to the release paper 15 by the adhesive layer. The label paper 13 on which printing is completed is separated into the label 14 and the release paper 15 at a release bar 19. The release bar 19 is a V-shaped columnar member having two surfaces that intersect each other at an acute angle. The release bar 19 is installed along a Y axis. Before the start of printing, the release paper 15 is folded downward (on the negative side of a Z axis) at the intersection of the two surfaces of the release bar 19 and is sandwiched between the platen roller 17 and a release roller 20. Therefore, if the platen roller 17 rotates and printing is performed on the label 14, the release paper 15 is conveyed in the negative direction of the Z axis while being sandwiched between the platen roller 17 and the release roller 20. Then, the label 14 attached to the release paper 15 is separated from the release paper 15 at the intersection of the two surfaces of the release bar 19.

The label 14 separated from the release paper 15 is discharged from the discharge port 21 and stays at a position on the upper part of a holding member 22.

Inside the holding member 22, a release sensor 23 for detecting the presence or absence of the label 14 is installed. The release sensor 23 detects whether or not the label 14 released from the label paper 13 exists on the upper part of the holding member 22. If the release sensor 23 detects the label 14, the label printer 10 suspends the conveyance and printing of the label paper 13. Then, if the user removes the label 14 on which printing is completed from the upper part of the holding member 22, the release sensor 23 detects that the label 14 does not exist, and resumes the conveyance and printing of the label paper 13. A structure and an operating principle of the release sensor 23 will be described later.

Structure and Operating Principle of Release Sensor

Figure 2:
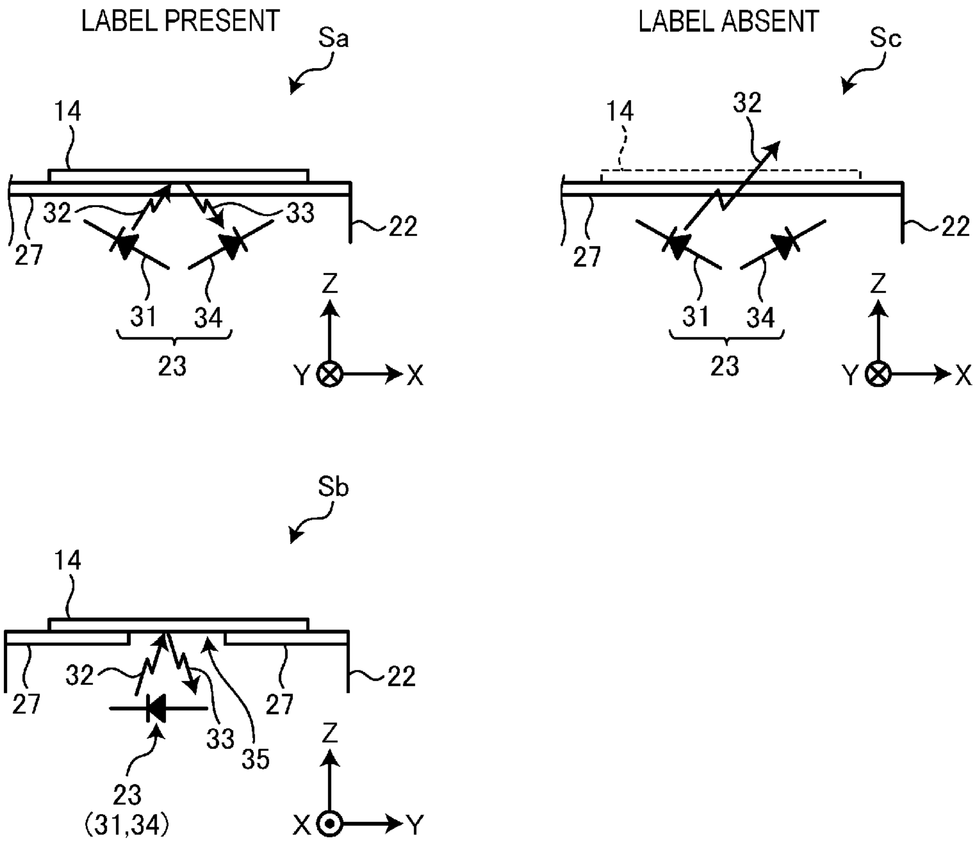
FIG. 2 is a diagram illustrating a structure and an operating principle of a release sensor included in the label printer.
Figure 3:
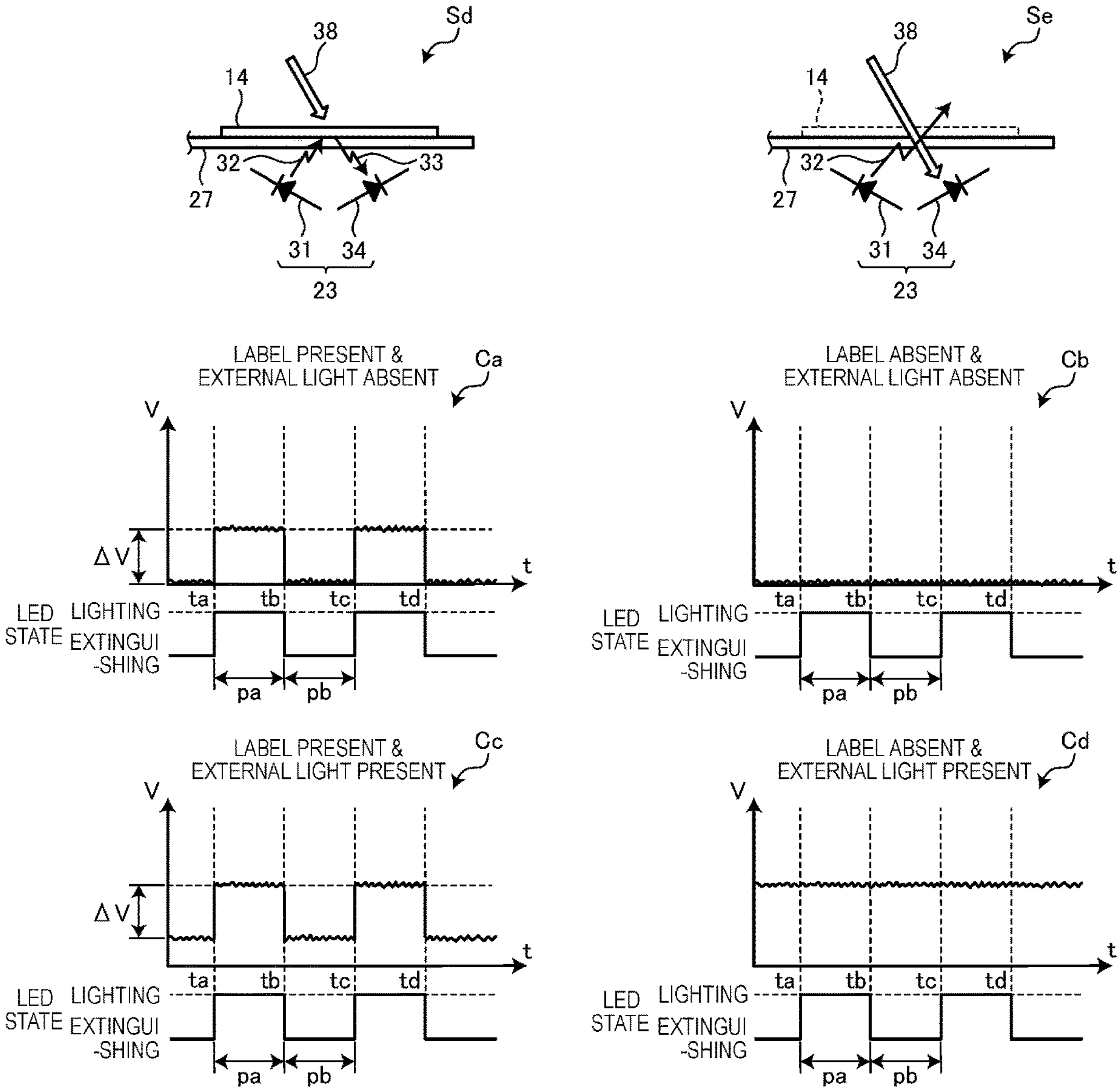
FIG. 3 is a diagram showing an example of a signal output detected by the release sensor under external light.

The structure and the operating principle of the release sensor 23 will be described with reference to FIGS. 2 and 3. FIG. 2 is a diagram illustrating the structure and the operating principle of the release sensor 23 included in the label printer 10 according to the first embodiment. FIG. 3 is a diagram showing an example of a signal output detected by the release sensor 23 under external light.

The release sensor 23 includes a light emitting element 31 and a light receiving element 34. The light emitting element 31 emits light at a predetermined cycle by the action of a drive circuit (not shown). The light emitting element 31 is, for example, a light emitting diode (LED). Hereinafter, the light emitting element 31 is also referred to as an LED 31. Any wavelength of the light emitted by the light emitting element 31 can be used but it is desirable to use near-infrared light which is invisible light. Further, it is desirable that the light receiving element 34 has a high sensitivity to light having the same wavelength as the light emitted by the light emitting element 31. Therefore, a filter that transmits light having the wavelength emitted by the light emitting element 31 may be installed on the surface of the light receiving element 34.

The light receiving element 34 outputs an electric signal according to the amount of received light in synchronization with a timing if the light emitting element 31 emits light. The light receiving element 34 is, for example, a photodiode. As described above, the release sensor 23 is a reflection type sensor in which the light receiving element 34 detects the reflected light of light emitted by the light emitting element 31.

The light emitting element 31 emits light toward the upper side of the holding member 22 from the gap 35 of a paper conveyance mold 27 formed on the upper part of the holding member 22. The light receiving element 34 detects the reflected light from the label 14 placed in the back of the gap 35 (on the positive side of the Z axis). It is assumed that the gap 35 is formed by cutting out a part of the paper conveyance mold 27 along the direction in which the label 14 is discharged, that is, along an X axis.

A detection state Sa shown in FIG. 2 shows how the emitted light 32 emitted by the LED 31 is reflected by the label 14 and the reflected light 33 is detected by the light receiving element 34.

At this time, as shown in a detection state Sb, the emitted light 32 emitted by the LED 31 passes through the gap 35 and then is reflected by the back surface (adhesive layer) of the label 14. Then, the reflected light 33 is detected by the light receiving element 34.

On the other hand, if the label 14 does not exist on the upper part of the paper conveyance mold 27, the emitted light 32 emitted by the LED 31 passes through the gap 35, and then, penetrates above (on the positive side of the Z axis) the paper conveyance mold 27, as shown in a detection state Sc in FIG. 2. Therefore, the emitted light 32 emitted by the LED 31 is not detected by the light receiving element 34.

Next, the signal output detected by the release sensor 23 under external light 38 will be described with reference to FIG. 3.

The paper conveyance mold 27 is provided at a position facing the outside of the housing 11 so that the label 14 on which printing is completed can be easily taken out. Therefore, the printed surface of the label 14 on which printing is completed is irradiated with the external light 38 in the environment in which the label printer 10 is placed. The external light 38 includes indoor lighting such as fluorescent lamps, incandescent lamps, and LED lighting, and sunlight. Such external light 38 may have an adverse effect if the release sensor 23 detects the presence or absence of the label 14.

A detection state Sd shown in FIG. 3 shows a state in which the printed surface of the label 14 is exposed to the external light 38 in a state where the label 14 is on which printing is completed on the paper conveyance mold 27.

In the detection state Sd, the emitted light 32 from the LED 31 is reflected by the back surface (adhesive layer) of the label 14 to generate the reflected light 33. Then, the light receiving element 34 detects the reflected light 33. At this time, if the surface of the label 14 is exposed to the external light 38, a part of the external light 38 passes through the label 14 and reaches the light receiving element 34 together with the reflected light 33 depending on an intensity of the external light 38 and a transmittance of the label 14. Therefore, in the detection state Sd, the light receiving element 34 outputs a larger sensor output V as compared with the case where there is no external light 38, regardless of whether the LED 31 is emitting the emitted light 32 or not.

The sensor output V obtained if the LED 31 illuminates the emitted light 32 is larger than the sensor output V obtained if the LED 31 does not illuminate the emitted light 32 by an amount corresponding to an intensity of the reflected light 33. Therefore, regardless of the intensity of the external light 38, the release sensor 23 can determine that the label 14 is present if a difference value between the sensor output V obtained if the LED 31 emits the emitted light 32 and the sensor output V obtained if the LED 31 does not emit the emitted light 32 is equal to or greater than a preset threshold value.

A detection state Se shown in FIG. 3 shows a state in which the surface of the paper conveyance mold 27 is exposed to the external light 38 without the label 14.

In the detection state Se, the emitted light 32 from the LED 31 passes through the gap 35 (see FIG. 2) of the paper conveyance mold 27 and is radiated into the space. Therefore, the reflected light generated by the emitted light 32 is not detected by the light receiving element 34. At this time, if the surface of the paper conveyance mold 27 is exposed to the external light 38, the external light 38 passes through the gap 35 and reaches the light receiving element 34, and thus the light receiving element 34 outputs the sensor output V corresponding to the intensity of the external light 38. And this state is not related to the emission state of the emitted light 32 by the LED 31. Therefore, in the detection state Se, there is almost no difference between the sensor output V obtained if the LED 31 emits the emitted light 32 and the sensor output V obtained if the LED 31 does not emit the emitted light 32. Therefore, regardless of the intensity of the external light 38, the release sensor 23 can determine that the label 14 does not exist if the difference value between the sensor output V obtained if the LED 31 emits the emitted light 32 and the sensor output V obtained if the LED 31 does not emit the emitted light 32 is less than the preset threshold value.

Hereinafter, a method of determining the presence or absence of the label 14 based on a waveform of the actual sensor output V will be described. The sensor output example Ca shown in FIG. 3 shows an example of the sensor output V if the label 14 is on the paper conveyance mold 27 and there is no external light 38.

The LED 31 repeatedly switches between a lighting state and an extinguishing state at a predetermined timing. In a case of the sensor output example Ca, the LED 31 is turned on between time ta and time tb, and between time tc and time td. On the other hand, the LED 31 is turned off before the time ta, between the time tb and the time tc, and after the time td. The period in which the LED 31 is turned on is defined as a lighting period pa, and the period in which the LED 31 is turned off is defined as an extinguishing period pb. The lengths of the lighting period pa and the extinguishing period pb are freely set. Further, the ratio (duty ratio) of the lighting period pa and the extinguishing period pb can be set to any ratio.

At this time, the sensor output V output by the light receiving element 34 exhibits a pulse waveform as shown in the sensor output example Ca. That is, a very small sensor output V can be obtained during the extinguishing period pb of the LED 31. Then, in the lighting period pa, the sensor output V corresponding to the emitted light 32 of the LED 31 is obtained. Then, a difference value ΔV is generated between the sensor output V in the lighting period pa and the sensor output V in the extinguishing period pb.

Here, it is assumed that the sensor output V is generated by positive logic, that is, the larger the amount of light received by the light receiving element 34, the larger the sensor output V is output. The sensor output V may be generated by negative logic. That is, the smaller sensor output V may be output as the amount of light received by the light receiving element 34 increases.

On the other hand, the sensor output example Cb shown in FIG. 3 shows an example of the sensor output V if there is no label 14 on the paper conveyance mold 27 and there is no external light 38. Lighting and extinguishing timings of the LED 31 in the sensor output example Cb are the same as those described in the sensor output example Ca.

At this time, the sensor output V output by the light receiving element 34 is substantially equal regardless of whether the LED 31 is turned on or off, as shown in the sensor output example Cb. That is, the difference value ΔV between the sensor output V in the lighting period pa and the sensor output V in the extinguishing period pb is a very small value.

From the comparison between the sensor output example Ca and the sensor output example Cb, if there is no external light 38, the difference value ΔV between the sensor output V in the lighting period pa and the sensor output V in the extinguishing period pb is compared with the threshold value. If the difference value ΔV is equal to or greater than the threshold value, it can be determined that the label 14 exists. Further, if the difference value ΔV is less than the threshold value, it can be determined that the label 14 does not exist.

The sensor output example Cc shown in FIG. 3 shows an example of the sensor output V if the label 14 is on the paper conveyance mold 27 and the external light 38 is present. Lighting and extinguishing timings of the LED 31 in the sensor output example Cc are the same as those described in the sensor output example Ca.

At this time, the sensor output V output by the light receiving element 34 exhibits a pulse waveform as shown in the sensor output example Cc. That is, a small sensor output V can be obtained during the extinguishing period pb of the LED 31. The sensor output V obtained during the extinguishing period pb of the LED 31 has a larger value than the sensor output V obtained at the same timing of the sensor output example Ca by the amount that the external light 38 passed through the label 14 reaches the light receiving element 34. Then, in the lighting period pa, a sensor output V larger than that in the extinguishing period pb can be obtained. Then, the difference value ΔV is generated between the sensor output V in the lighting period pa and the sensor output V in the extinguishing period pb.

On the other hand, the sensor output example Cd shown in FIG. 3 shows an example of the sensor output V if there is no label 14 on the paper conveyance mold 27 and there is external light 38. The lighting and extinguishing timings of the LED 31 in the sensor output example Cd are the same as those described in the sensor output example Ca.

At this time, the sensor output V output by the light receiving element 34 has substantially the same value corresponding to the intensity of the external light 38 regardless of whether the LED 31 is turned on or off, as shown in the sensor output example Cd. That is, the difference value ΔV between the sensor output V in the lighting period pa and the sensor output V in the extinguishing period pb is a very small value.

From the comparison between the sensor output example Cc and the sensor output example Cd, if the external light 38 is present, the difference value ΔV between the sensor output V in the lighting period pa and the sensor output V in the extinguishing period pb is compared with the threshold value. If the difference value ΔV is equal to or greater than the threshold value, it can be determined that the label 14 exists. Further, if the difference value ΔV is less than the threshold value, it can be determined that the label 14 does not exist.

That is, regardless of the presence or absence of the external light 38, if the difference value ΔV between the sensor output V in the lighting period pa and the sensor output V in the extinguishing period pb is compared with the threshold value. If the difference value ΔV is equal to or greater than the threshold value, it can be determined that the label 14 exists. Further, if the difference value ΔV is less than the threshold value, it can be determined that the label 14 does not exist.

Functional Configuration of Label Printer

Figure 4:
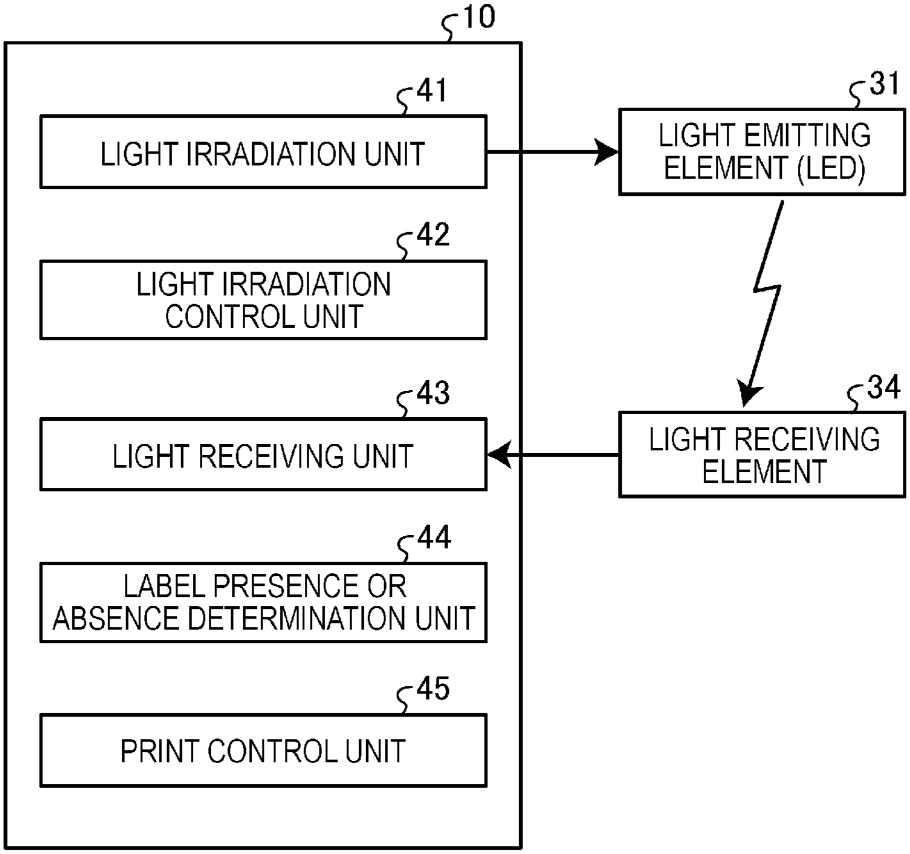
FIG. 4 is a functional block diagram showing an example of a functional configuration of the label printer.

A functional configuration of the label printer 10 will be described with reference to FIG. 4. FIG. 4 is a functional block diagram showing an example of the functional configuration of the label printer 10.

The control unit (not shown) included in the label printer 10 has a computer configuration and operates by executing a control program stored in the control unit. The control unit implements a light irradiation unit 41, a light irradiation control unit 42, a light receiving unit 43, a label presence or absence determination unit 44, and a print control unit 45 shown in FIG. 4 as functional units.

The light irradiation unit 41 irradiates the area illuminated by the external light 38 where the label 14 on which printing is completed exists with light from the light emitting element 31.

The light irradiation control unit 42 switches between light irradiation and non-irradiation by the light irradiation unit 41.

The light receiving unit 43 acquires an optical signal from the area where the label 14 on which printing is completed exists in synchronization with the light irradiation and non-irradiation by the light irradiation control unit 42, by the light receiving element 34.

The label presence or absence determination unit 44 determines the presence or absence of the label 14 based on the sensor output V (first signal) acquired by the light receiving unit 43 if the light irradiation unit 41 is not emitting light and the sensor output V (second signal) acquired by the light receiving unit 43 if the light irradiation unit 41 is emitting light.

The print control unit 45 acquires print content and an instruction to start printing and instructs each unit of the label printer 10 to start printing. Further, the print control unit 45 suspends printing of a next label on a condition that the label presence or absence determination unit 44 determines that the label 14 is present. Further, the print control unit 45 instructs each unit of the label printer 10 to start printing of a next label on a condition that the label presence or absence determination unit 44 determines that there is no label 14. Further, the print control unit 45 determines whether or not a predetermined number of sheets of labels 14 are printed.

Flow of Printing Operation Performed by Label Printer

Figure 5:
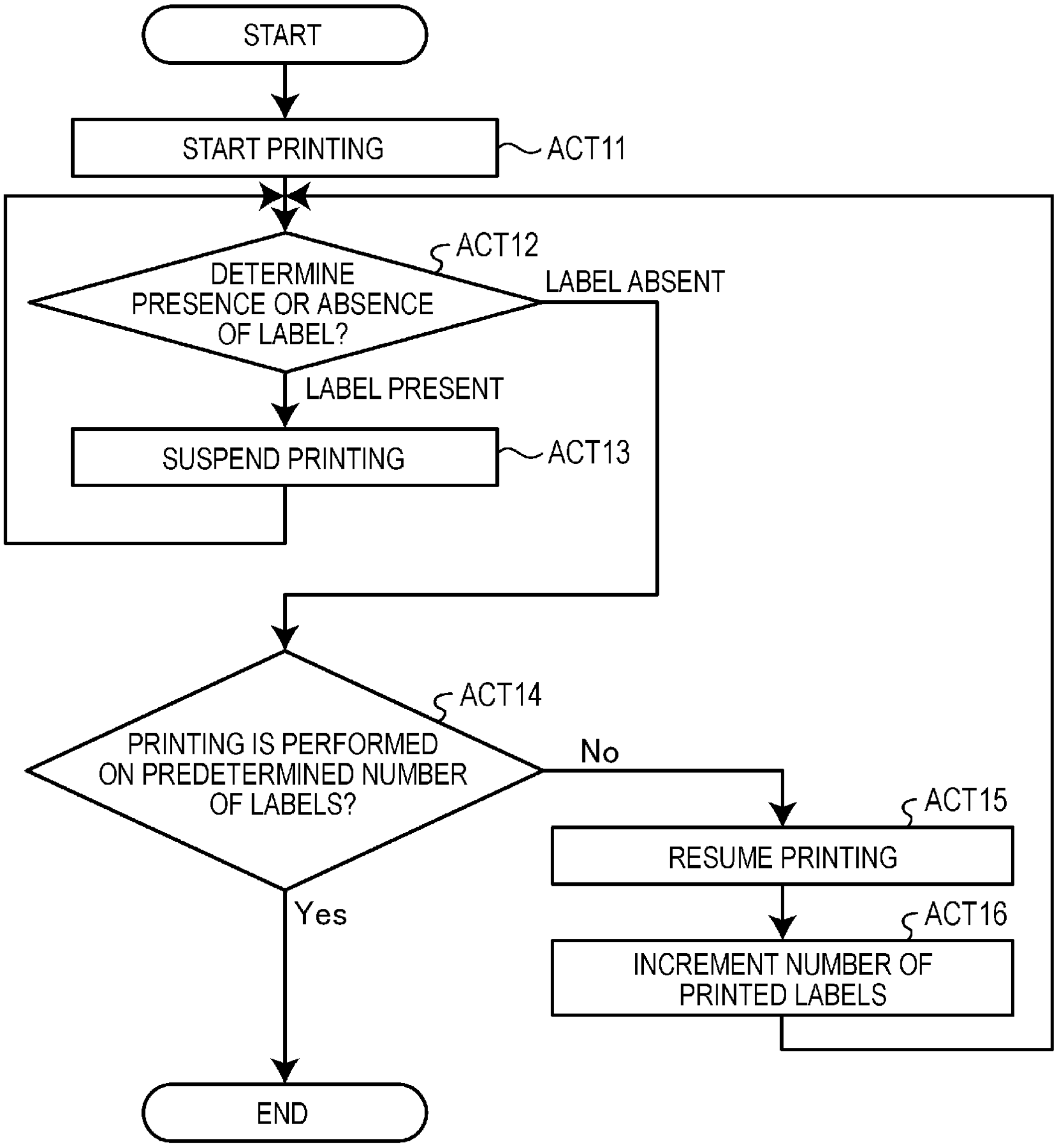
FIG. 5 is a flowchart showing an example of a flow of printing operation of the label printer.
Figure 6:
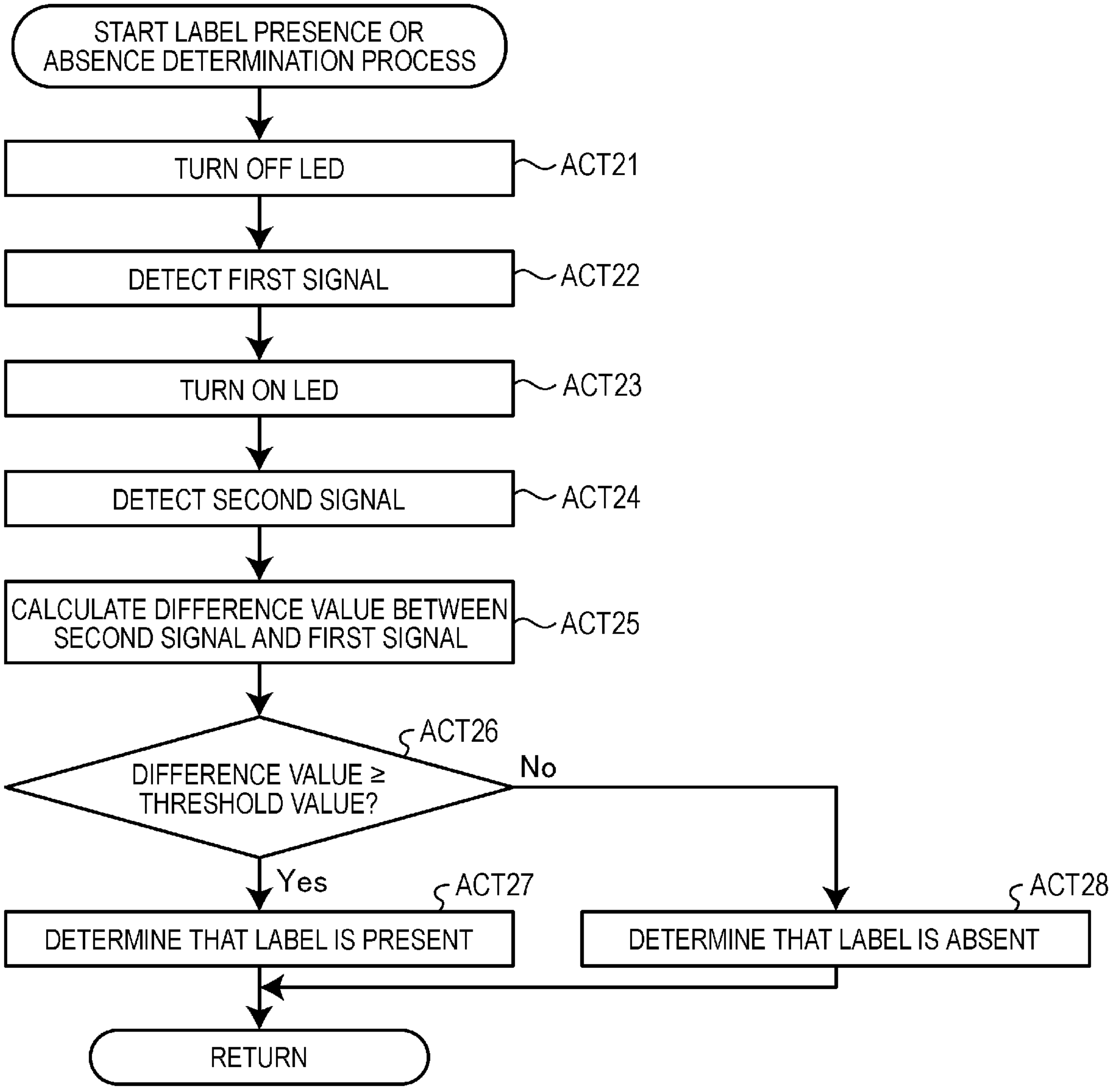
FIG. 6 is a flowchart showing an example of a flow of a process for determining presence or absence of a label in the flowchart of FIG. 5.

A flow of a printing process performed by the label printer 10 will be described with reference to FIGS. 5 and 6. FIG. 5 is a flowchart showing an example of a flow of printing operation of the label printer 10 according to the first embodiment. FIG. 6 is a flowchart showing an example of a flow of a process for determining the presence or absence of the label 14 in the flowchart of FIG. 5.

The print control unit 45 instructs each unit of the label printer 10 to start printing (ACT 11).

The label presence or absence determination unit 44 performs a label presence or absence determination process for determining the presence or absence of the label 14 (ACT 12). If it is determined that the label 14 is present, the process proceeds to ACT 13. On the other hand, if it is not determined that the label 14 is present, the process proceeds to ACT 14. A detailed flow of the label presence or absence determination process will be described later (see FIG. 6).

If it is determined in ACT 12 that the label 14 is present, the print control unit 45 suspends the printing operation (ACT 13). After that, the process returns to ACT 12, and the label presence or absence determination process is repeated.

In ACT 12, if it is determined that there is no label 14, that is, it is determined that the label 14 on which printing is completed is removed from the holding member 22, the print control unit 45 determines whether printing is performed on the predetermined number of sheets of labels 14 (ACT 14). If it is determined that printing is performed on the predetermined number of sheets of labels 14 (ACT 14: Yes), the label printer 10 ends the process of FIG. 5. On the other hand, if it is not determined that printing is performed on the predetermined number of sheets of labels 14 (ACT 14: No), the process proceeds to ACT 15.

If it is not determined in ACT 14 that printing is performed on the predetermined number of sheets of labels 14, the print control unit 45 resumes printing (ACT 15).

The print control unit 45 increments the number of labels 14 on which printing is completed (ACT 16). Then, the process returns to ACT 12.

Next, the flow of the label presence or absence determination process will be described with reference to FIG. 6.

First, the light irradiation control unit 42 turns off the LED 31 with respect to the light irradiation unit 41 (ACT 21).

The light receiving unit 43 detects the sensor output V (first signal) of the light receiving element 34 (ACT 22).

The light irradiation control unit 42 turns on the LED 31 with respect to the light irradiation unit 41 (ACT 23).

The light receiving unit 43 detects the sensor output V (second signal) of the light receiving element 34 (ACT 24).

The label presence or absence determination unit 44 calculates the difference value ΔV between the second signal and the first signal (ACT 25).

The label presence or absence determination unit 44 determines whether the difference value ΔV is equal to or greater than the threshold value Th (ACT 26). If it is determined that the difference value ΔV is equal to or greater than the threshold value Th (ACT 26: Yes), the process proceeds to ACT 27. On the other hand, if it is not determined that the difference value ΔV is equal to or greater than the threshold value Th (ACT 26: No), the process proceeds to ACT 28.

If it is determined in ACT 26 that the difference value ΔV is equal to or greater than the threshold value Th, the label presence or absence determination unit 44 determines that the label 14 is on the holding member 22 (paper conveyance mold 27) (ACT 27). After that, the process returns to the main routine (FIG. 5).

If it is determined in ACT 26 that the difference value ΔV is less than the threshold value Th, the label presence or absence determination unit 44 determines that there is no label 14 on the holding member 22 (paper conveyance mold 27) (ACT 28). After that, the process returns to the main routine (FIG. 5).

Method of Setting Threshold Value

Figure 7:
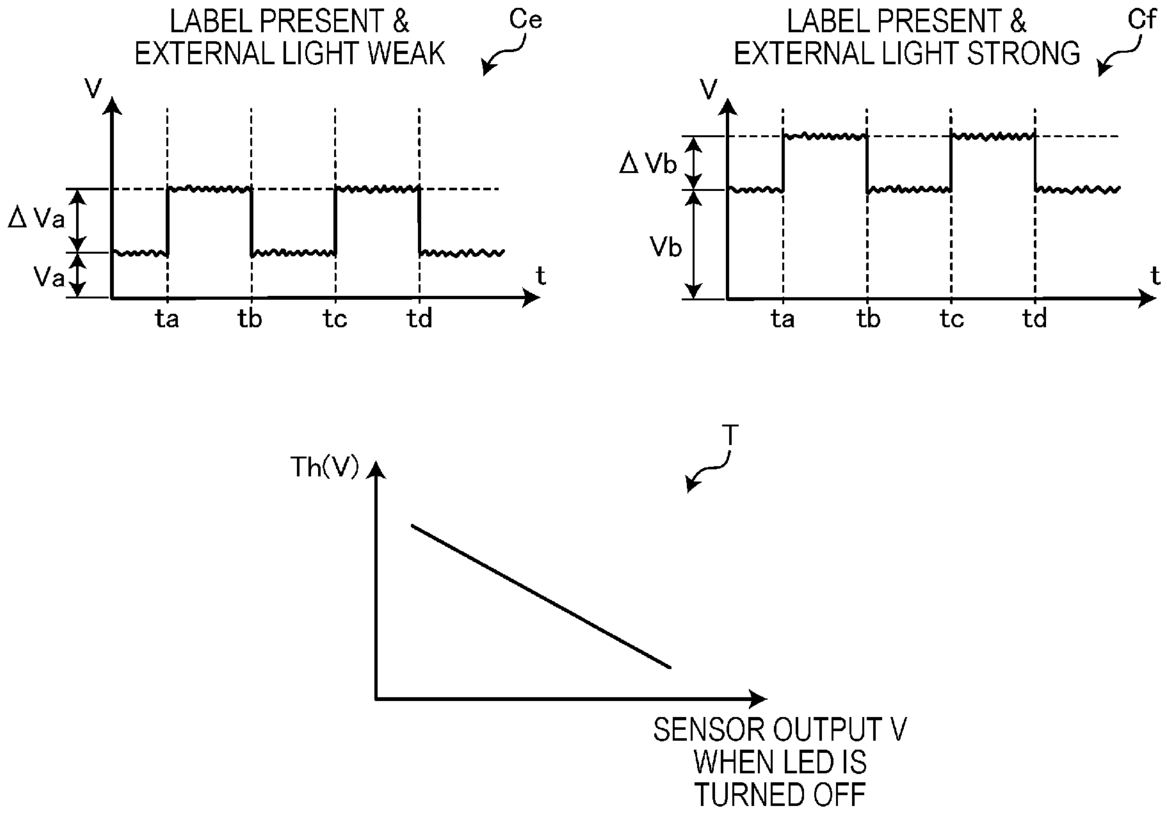
FIG. 7 is a diagram illustrating a method of setting a threshold value for determining the presence or absence of the label according to an intensity of external light.

A method of setting the threshold value Th for determining the presence or absence of the label 14 will be described with reference to FIG. 7. FIG. 7 is a diagram illustrating the method of setting the threshold value Th for determining the presence or absence of the label 14, depending on the intensity of external light.

As shown in the sensor output example Ce of FIG. 7, the sensor output V has a form in which a pulse-shaped output corresponding to if the LED 31 is turned on is superimposed on the sensor output V corresponding to if the LED 31 is turned off. This form is maintained even if the external light 38 becomes stronger, but as the external light 38 becomes stronger, the sensor output V increases, and as shown in the sensor output example Cf of FIG. 7, the sensor output corresponding to if the LED 31 is turned off increases from a sensor output Va to a sensor output Vb. Further, since the emitted light 32 if the LED 31 is turned on is constant, the stronger the external light 38, the smaller the ratio of the emitted light 32 to the intensity of the external light 38. Therefore, the stronger the external light 38, the smaller the difference value ΔV of the sensor outputs V.

That is, in the example shown in FIG. 7, a difference value ΔVb if the external light 38 is strong is smaller than a difference value ΔVa if the external light 38 is weak.

Therefore, in an environment where the intensity of the external light 38 changes, it is difficult to determine the presence or absence of the label 14 by comparing the difference value ΔV with the fixed threshold value Th. Therefore, it is desirable that the label printer 10 has a function of setting the threshold value Th according to the intensity of the external light 38.

As described above, the sensor output V corresponding to if the LED 31 is turned off increases as the external light 38 becomes stronger. Then, the difference value ΔV decreases as the external light 38 becomes stronger. Therefore, it is desirable that the label presence or absence determination unit 44 sets a threshold value Th (V) that decreases monotonically according to the sensor output V if the LED 31 is turned off. More specifically, it is desirable that the label presence or absence determination unit 44 has a threshold value setting table T shown in FIG. 7 and sets the threshold value Th (V) that decreases monotonically as the external light 38 increases. In FIG. 7, the threshold value Th (V) is linearly decreased with the increase of the sensor output V if the LED 31 is turned off, but the exemplary embodiment is not limited thereto. For example, the threshold value Th (V) may be decreased non-linearly with the increase of the sensor output V if the LED 31 is turned off. The threshold value Th (V) is determined using the results of evaluation experiments conducted in advance.

Although not shown, flicker may occur in which the brightness of the illumination fluctuates periodically depending on the illumination conditions of the environment in which the label printer 10 is placed. If flicker occurs, the fluctuation of the illumination light due to the flicker is superimposed on the sensor output V. Therefore, depending on a timing of acquiring the sensor output V if the LED 31 is turned off and the sensor output V if the LED 31 is turned on, a difference value ΔV different from the actual one may be calculated.

In order to reduce the influence of such flicker, the label presence or absence determination unit 44 may calculate an average value of the sensor output V in the section for each of the extinguishing period pb of the LED 31 and the lighting period pa of the LED 31 and may calculate the difference value ΔV from the calculated average value of the sensor output V if the LED 31 is turned off and the calculated average value of the sensor output V if the LED 31 is turned on. In addition to the average value, the maximum value within the period may be calculated, or the minimum value within the period may be calculated.

Action and Effect of Embodiment

As described above, the label printer 10 of the first embodiment includes the light irradiation unit 41 that irradiates the area illuminated by the external light 38 where the label 14 on which printing is completed exists with light, the light irradiation control unit 42 that switches between the light irradiation and non-irradiation by the light irradiation unit 41, the light receiving unit 43 that acquires the optical signal from the area where the label 14 on which printing is completed exists in synchronization with the light irradiation and non-irradiation by the light irradiation control unit 42, and the label presence or absence determination unit 44 that determines the presence or absence of the label 14 based on the first signal acquired by the light receiving unit 43 if the light irradiating unit 41 is not emitting light, and the second signal acquired by the light receiving unit 43 if the light irradiating unit 41 is emitting light. Therefore, even if the printed label 14 is at a position illuminated by the external light 38, the presence of the printed label 14 can be reliably detected.

Further, in the label printer 10 of the first embodiment, the light irradiation unit 41 and the light receiving unit 43 are installed on the same side of the label surface of the label 14 on which printing is completed. Therefore, the light irradiation unit 41 and the light receiving unit 43 can be installed in a small space.

Further, in the label printer 10 of the first embodiment, the label presence or absence determination unit 44 determines the presence or absence of the label 14 on which the printing is completed, based on the magnitude relationship between the difference value ΔV between the level of the first signal and the level of the second signal and the threshold value Th. Therefore, the presence or absence of the label 14 can be detected by simple signal processing.

Further, in the label printer 10 of the first embodiment, the label presence or absence determination unit 44 sets the threshold value Th (V) based on the level of the first signal (sensor output V). Therefore, even if the intensity of the external light 38 changes, the presence or absence of the label 14 can be reliably detected.

Further, the label printer 10 of the first embodiment further includes the print control unit 45 that suspends the printing of the next label 14 on the condition that the label presence or absence determination unit 44 determines that the label 14 is present, and resumes printing of the next label 14 on the condition that the label presence or absence determination unit 44 determines that there is no label 14. Therefore, it is possible to prevent the printed label 14 from staying in the discharge port 21.

Second Embodiment

Hereinafter, a second embodiment of the label printer according to the exemplary embodiment will be described in detail with reference to the accompanying drawings.

Overall Configuration of Label Printer

Figure 8:
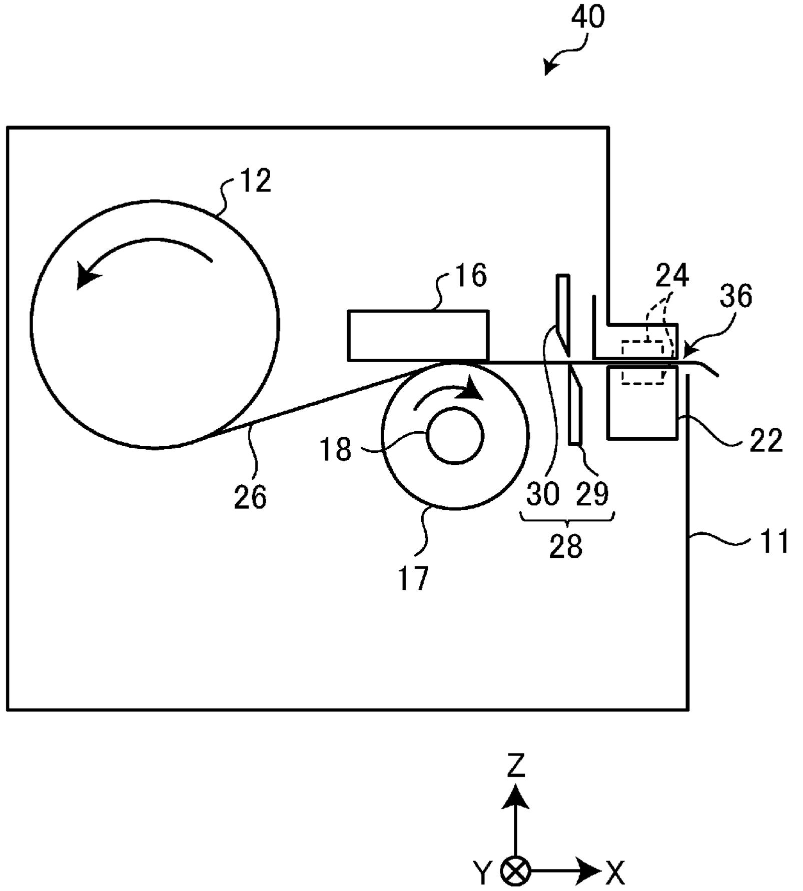
FIG. 8 is a cross-sectional view showing an example of an internal structure of a label printer according to a second embodiment.

A schematic configuration of a label printer 40 according to the second embodiment will be described with reference to FIG. 8. FIG. 8 is a cross-sectional view showing an example of an internal structure of the label printer 40 according to the second embodiment. The label printer 40 is an example of the printer device in the present disclosure.

The label printer 40 includes the label roll 12 in which linerless label paper 26, which is an example of printing paper, is wound in a roll shape inside the housing 11. Then, the label printer 40 prints while pulling out the linerless label paper 26 from the label roll 12.

The linerless label paper 26 has a printed surface on the front surface and an adhesive surface on the back surface. That is, the linerless label paper 26 is a label paper without the release paper 15 (see FIG. 1). The linerless label paper 26 pulled out from the label roll 12 is conveyed toward the discharge port 36 in a state of being sandwiched between the platen roller 17 and the thermal head 16. At this time, the printing surface of the linerless label paper 26 is located on the thermal head 16 side. The linerless label paper 26 is an example of the label in the present disclosure.

The thermal head 16 prints on the printing surface of the linerless label paper 26 sandwiched between the thermal head 16 and the platen roller 17. The label printer 40 may be a type of performing printing by sandwiching an ink ribbon (not shown) between the thermal head 16 and the linerless label paper 26 and transferring the ink of the ink ribbon heated by the thermal head 16 on the printing surface of the linerless label paper 26.

The linerless label paper 26 discharged from the discharge port 36 stays at the position on the upper part of the holding member 22. Then, the linerless label paper 26 is removed from the upper part of the holding member 22 cut by a cutter 28 provided on the upstream side of the holding member 22. The cutter 28 is composed of a fixed blade 29 provided on the back surface side of the linerless label paper 26 and a movable blade 30 provided on the printing surface side of the linerless label paper 26, and may perform cutting by an operator's manual operation or automatically at the end of printing.

At the position of the holding member 22, the label sensor 24 for detecting the presence or absence of the linerless label paper 26 (label) is installed. The label sensor 24 is installed on the upper part of the holding member 22 at a position facing each other across the label surface of the linerless label paper 26, and detects whether or not the linerless label paper 26 exists. If the label sensor 24 detects the linerless label paper 26, the label printer 40 suspends the conveyance and printing of the linerless label paper 26. Then, if the user removes the linerless label paper 26 on which printing is completed, the label sensor 24 detects that the linerless label paper 26 does not exist, and resumes the conveyance and printing of the linerless label paper 26. A structure and an operating principle of the label sensor 24 will be described later.

Further, since a functional configuration of the label printer 40 is the same as the functional configuration of the label printer 10 described above (see FIG. 4), the description thereof will be omitted. Further, in the following description, the same reference numerals as those used in FIG. 4 are used for the description of each functional part of the label printer 40.

Structure and Operating Principle of Label Sensor

Figure 9:
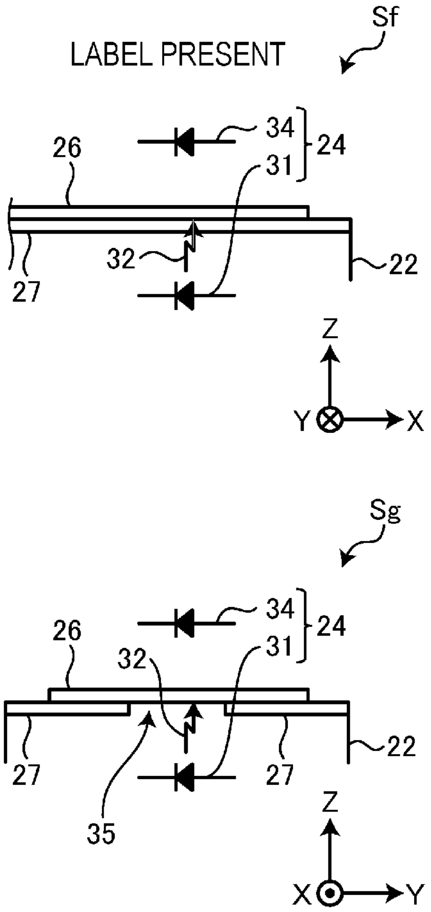
FIG. 9 is a diagram illustrating a structure and an operating principle of a label sensor included in the label printer.
Figure 10:
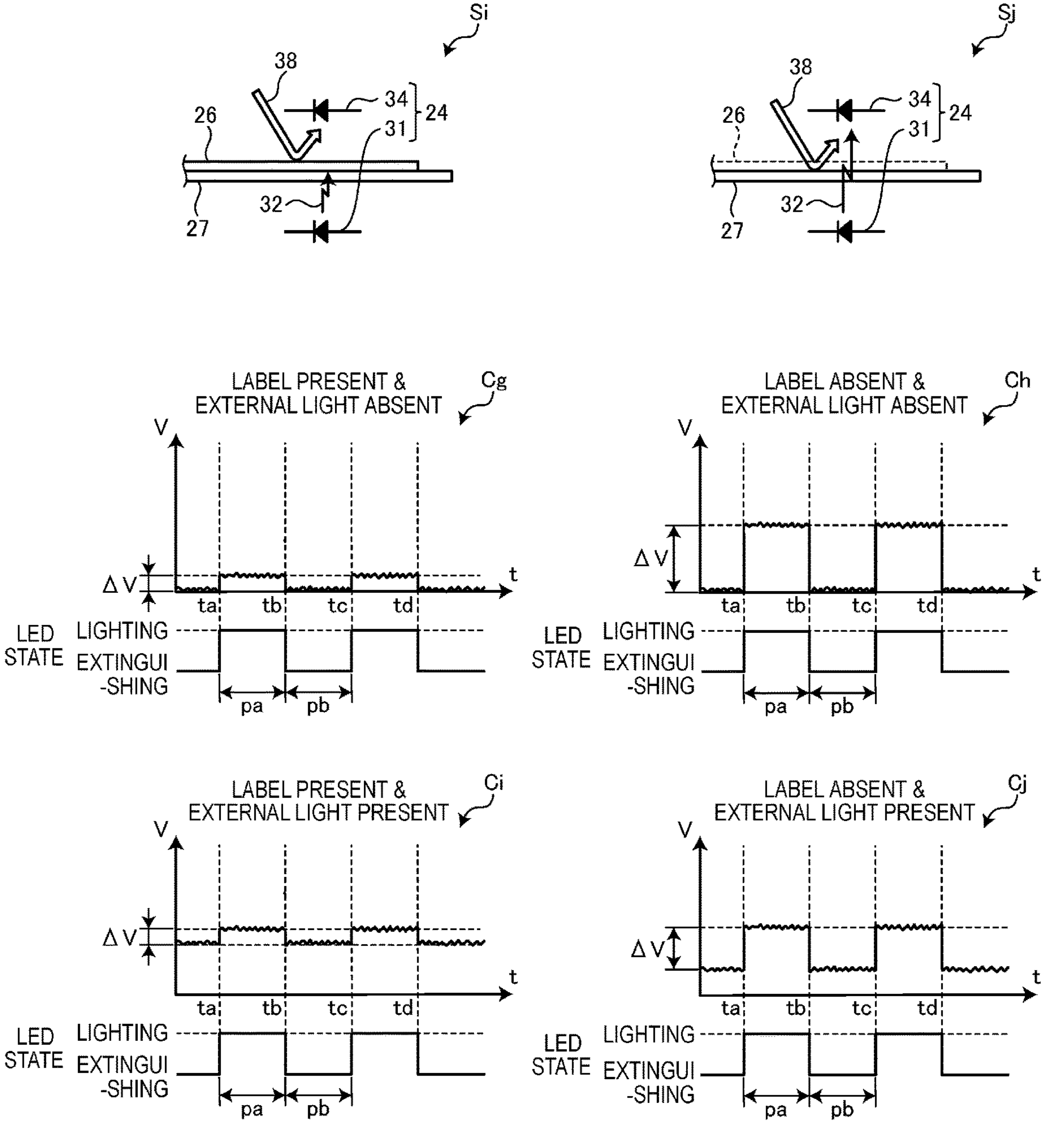
FIG. 10 is a diagram showing an example of a signal output detected by the label sensor under external light.

A structure and an operating principle of the label sensor 24 will be described with reference to FIGS. 9 and 10. FIG. 9 is a diagram illustrating the structure and operating principle of the label sensor 24 included in the label printer 40 according to the second embodiment. FIG. 10 is a diagram showing an example of a signal output detected by the label sensor 24 under external light.

The label sensor 24 includes the light emitting element 31 and the light receiving element 34. The light emitting element 31 emits light at a predetermined cycle by the action of a drive circuit (not shown). The light emitting element 31 is, for example, an LED. Any wavelength of the light emitted by the light emitting element 31 can be used, but it is desirable to use near-infrared light which is invisible light. Further, it is desirable that the light receiving element 34 has a high sensitivity to light having the same wavelength as the light emitted by the light emitting element 31. Therefore, a filter that transmits light having the wavelength emitted by the light emitting element 31 may be installed on the surface of the light receiving element 34.

The light receiving element 34 outputs an electric signal according to the amount of received light in synchronization with a timing if the light emitting element 31 emits light. The light receiving element 34 is, for example, a photodiode. As described above, the label sensor 24 is a transmission type sensor that detects the transmitted light of the light emitted by the light emitting element 31 by the light receiving element 34.

The light emitting element 31 and the light receiving element 34 are installed at positions facing each other with the paper conveyance mold 27, which is formed on the upper part of the holding member 22, interposed therebetween. The light emitting element 31 emits light toward the upper side of the holding member 22 from the gap 35 of the paper conveyance mold 27 formed on the upper part of the holding member 22. The light receiving element 34 detects the light transmitted through the gap 35. It is assumed that the gap 35 is formed by cutting out a part of the paper conveyance mold 27 along the direction in which the linerless label paper 26 is discharged, that is, along the X axis.

A detection state Sf shown in FIG. 9 shows a state in which the emitted light 32 emitted by the LED 31 is blocked by the linerless label paper 26 and the emitted light 32 is not detected by the light receiving element 34.

At this time, as shown in a detection state Sg, the emitted light 32 emitted by the LED 31 passes through the gap 35 and then hits the adhesive surface of the linerless label paper 26. Then, a small part of the emitted light 32 passes through the linerless label paper 26 and reaches the light receiving element 34, but since the amount of the emitted light 32 transmitted through the linerless label paper 26 is small, the light receiving element 34 outputs a slightly larger sensor output V as compared with the case where there is no emitted light 32.

On the other hand, if the linerless label paper 26 does not exist on the upper part of the paper conveyance mold 27, as shown in the detection state Sh in FIG. 9, the emitted light 32 emitted by the LED 31 passes through the gap 35 and then penetrates above (on the positive side of the Z axis) the paper conveyance mold 27. Then, the light receiving element 34 detects the emitted light 32 of the LED 31. Therefore, the light receiving element 34 outputs a larger sensor output V as compared with the case where there is no emitted light 32.

Next, the signal output detected by the label sensor 24 under the external light 38 will be described with reference to FIG. 10.

The paper conveyance mold 27 is located on the surface of the housing 11 so that the linerless label paper 26 on which printing is completed can be easily taken out. Then, the printed surface of the linerless label paper 26 on which printing is completed is irradiated with the external light 38 through the gap between the paper conveyance mold 27 and the installation position of the light receiving element 34 in the environment in which the label printer 40 is placed. The external light 38 includes indoor lighting such as fluorescent lamps, incandescent lamps, and LED lighting, and sunlight. Such external light 38 may have an adverse effect if the label sensor 24 detects the presence or absence of the linerless label paper 26.

A detection state Si shown in FIG. 10 shows a state in which the printing surface of the linerless label paper 26 is exposed to the external light 38 in a state where the printed linerless label paper 26 is on the paper conveyance mold 27.

In the detection state Si, the emitted light 32 from the LED 31 hits the back surface (adhesive surface) of the linerless label paper 26. Then, a part of the emitted light 32 passes through the linerless label paper 26 and reaches the light receiving element 34, but the sensor output V output by the light receiving element 34 is very small. At this time, if the surface of the linerless label paper 26 is exposed to the external light 38, a part of the external light 38 is reflected on the surface of the linerless label paper 26 and reaches the light receiving element 34. Therefore, in the detection state Si, the light receiving element 34 outputs a larger sensor output V as compared with the case where there is no external light 38, regardless of whether the LED 31 is illuminating the emitted light 32 or not. And, as described above, the sensor output V by the emitted light 32 from the LED 31 is very small. Therefore, the label sensor 24 can determine that the linerless label paper 26 is present if the difference value between the sensor output V obtained if the LED 31 emits the emitted light 32 and the sensor output V obtained if the LED 31 does not emit the emitted light 32 is less than a preset threshold value.

On the other hand, a detection state Sj shown in FIG. 10 shows a state in which the surface of the paper conveyance mold 27 is exposed to the external light 38 without the linerless label paper 26.

In the detection state Sj, the emitted light 32 from the LED 31 passes through the gap 35 (see FIG. 9) of the paper conveyance mold 27 and reaches the light receiving element 34. Therefore, the emitted light 32 is detected by the light receiving element 34. At this time, a part of the external light 38 to which the surface of the paper conveyance mold 27 is exposed also reaches the light receiving element 34. Therefore, the light receiving element 34 outputs the sensor output V, which is the sum of the emitted light 32 from the LED 31 and the reflected light of the external light 38.

Further, the sensor output V obtained if the LED 31 emits the emitted light 32 is larger than the sensor output V obtained if the LED 31 does not emit the emitted light 32. Therefore, regardless of the intensity of the external light 38, the label sensor 24 can determine that there is no linerless label paper 26 if the difference value between the sensor output V obtained if the LED 31 emits the emitted light 32 and the sensor output V obtained if the LED 31 does not emit the emitted light 32 is equal to or greater than a preset threshold value.

Hereinafter, a method of determining the presence or absence of the linerless label paper 26 based on the waveform of the actual sensor output V will be described. The sensor output example Cg shown in FIG. 10 shows an example of the sensor output V if the linerless label paper 26 is on the paper conveyance mold 27 and there is no external light 38.

In any of the states shown in FIG. 10, the LED 31 repeatedly switches between a lighting state and an extinguishing state at the same timing as described in FIG. 3.

At this time, the sensor output V output by the light receiving element 34 exhibits a pulse waveform as shown in the sensor output example Cg. That is, a very small sensor output V can be obtained during the extinguishing period pb of the LED 31. Then, in the lighting period pa, a part of the emitted light 32 of the LED 31 passes through the linerless label paper 26, and thus a sensor output V slightly larger than the extinguishing period pb of the LED 31 can be obtained. Then, a very small difference value ΔV is generated between the sensor output V in the lighting period pa and the sensor output V in the extinguishing period pb.

On the other hand, the sensor output example Ch shown in FIG. 10 shows an example of the sensor output V if there is no linerless label paper 26 on the paper conveyance mold 27 and there is no external light 38. Lighting and extinguishing timings of the LED 31 in the sensor output example Ch are the same as those described in the sensor output example Ca (see FIG. 3).

At this time, as shown in the sensor output example Ch, the light receiving element 34 generates a sensor output V corresponding to the emitted light 32 of the LED 31 during the lighting period pa of the LED 31. Then, a difference value ΔV is generated between the sensor output V in the lighting period pa and the sensor output V in the extinguishing period pb. The difference value ΔV generated at this time is larger than the difference value ΔV generated in the sensor output example Cg because the emitted light 32 of the LED 31 is directly incident on the light receiving element 34.

From the comparison between the sensor output example Cg and the sensor output example Ch, if there is no external light 38, the difference value ΔV between the sensor output V in the lighting period pa and the sensor output V in the extinguishing period pb is compared with the threshold value. If the difference value ΔV is equal to or greater than the threshold value, it can be determined that the linerless label paper 26 does not exist. Further, if the difference value ΔV is less than the threshold value, it can be determined that the linerless label paper 26 exists.

The sensor output example Ci shown in FIG. 10 shows an example of the sensor output V if the linerless label paper 26 is on the paper conveyance mold 27 and the external light 38 is present. Lighting and extinguishing timings of the LED 31 in the sensor output example Ci are the same as those described in the sensor output example Ca.

At this time, the sensor output V output by the light receiving element 34 exhibits a pulse waveform as shown in the sensor output example Ci. That is, during the extinguishing period pb of the LED 31, the sensor output V becomes substantially the same value corresponding to the intensity of the reflected light on the linerless label paper 26 of the external light 38. Then, during the lighting period pa of the LED 31, a part of the emitted light 32 of the LED 31 passes through the linerless label paper 26 and reaches the light receiving element 34, and thus the sensor output V slightly larger than that in the extinguishing period pb of the LED 31 is obtained. Then, a slight difference value ΔV is generated between the sensor output V in the lighting period pa and the sensor output V in the extinguishing period pb.

On the other hand, the sensor output example Cj shown in FIG. 10 shows an example of the sensor output V if there is no linerless label paper 26 on the paper conveyance mold 27 and the external light 38 is present. Lighting and extinguishing timings of the LED 31 in the sensor output example Cj are the same as those described in the sensor output example Ca.

At this time, the sensor output V output by the light receiving element 34 exhibits a pulse waveform as shown in the sensor output example Cj. That is, during the extinguishing period pb of the LED 31, the sensor output V corresponding to the intensity of the reflected light in the paper conveyance mold 27 of the external light 38 is obtained. If the paper conveyance mold 27 is a dark color with low reflectance, the sensor output V is smaller than the sensor output V in the extinguishing period pb of the LED 31 in the sensor output example Ci. Further, the sensor output V obtained during the lighting period pa of the LED 31 becomes a larger value than the sensor output V obtained during the extinguishing period pb of the LED 31 by the amount that the emitted light 32 of the LED 31 passed through the paper conveyance mold 27 reaches the light receiving element 34. Then, a difference value ΔV larger than the difference value ΔV generated in the sensor output example Ci is generated between the sensor output V in the lighting period pa and the sensor output V in the extinguishing period pb.

From the comparison between the sensor output example Ci and the sensor output example Cj, if the external light 38 is present, the difference value ΔV between the sensor output V in the lighting period pa and the sensor output V in the extinguishing period pb is compared with the threshold value. If the difference value ΔV is equal to or greater than the threshold value, it can be determined that the linerless label paper 26 does not exist. Further, if the difference value ΔV is less than the threshold value, it can be determined that the linerless label paper 26 exists.

That is, regardless of the presence or absence of the external light 38, if the difference value ΔV between the sensor output V in the lighting period pa and the sensor output V in the extinguishing period pb is compared with the threshold value. If the difference value ΔV is equal to or greater than the threshold value, it can be determined that the linerless label paper 26 does not exist. Further, if the difference value ΔV is less than the threshold value, it can be determined that the linerless label paper 26 exists.

Flow of Printing Operation Performed by Label Printer

Figure 11:
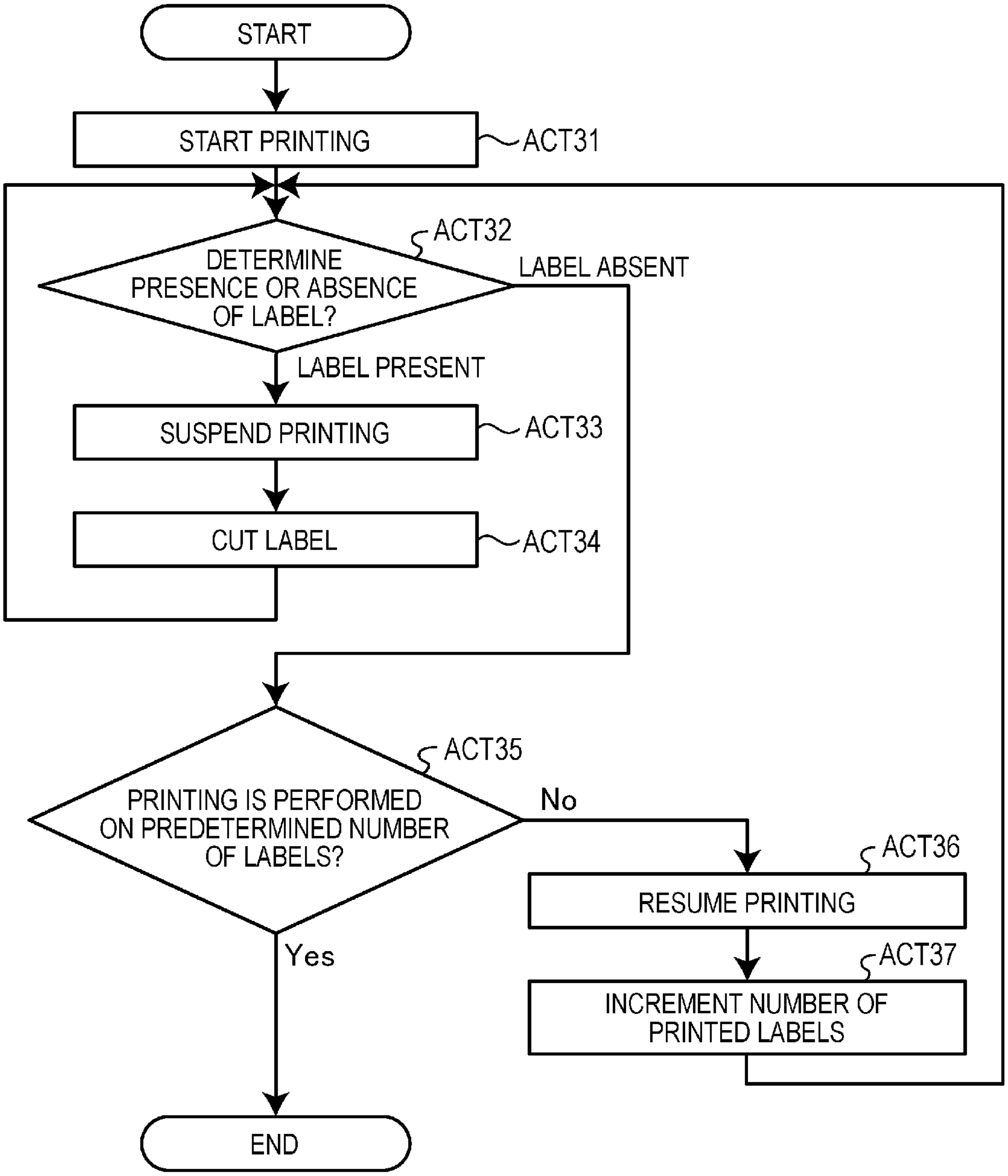
FIG. 11 is a flowchart showing an example of a flow of printing operation of the label printer.

A flow of the printing process performed by the label printer 40 will be described with reference to FIG. 11. FIG. 11 is a flowchart showing an example of the flow of the printing operation of the label printer 40 according to the second embodiment.

The print control unit 45 instructs each unit of the label printer 40 to start printing (ACT 31).

The label presence or absence determination unit 44 performs a label presence or absence determination process for determining the presence or absence of the linerless label paper 26 (ACT 32). If it is determined that the linerless label paper 26 is present, the process proceeds to ACT 33. On the other hand, if it is not determined that the linerless label paper 26 is present, the process proceeds to ACT 35. A detailed flow of the label presence or absence determination process is the same as the above-mentioned process flow (see FIG. 6). However, only the magnitude relationship between the difference value ΔV of the sensor outputs V and the threshold value Th is different from the first embodiment. That is, in the present embodiment, if the difference value ΔV is equal to or greater than the threshold value Th, it is determined that there is no linerless label paper 26. Further, if the difference value ΔV is less than the threshold value Th, it is determined that the linerless label paper 26 is present.

If it is determined in ACT 32 that the linerless label paper 26 is present, the print control unit 45 suspends the printing operation (ACT 33).

Subsequently, the print control unit 45 cuts the linerless label paper 26 by the cutter 28 (ACT 34). Then, the process returns to ACT 32. The linerless label paper 26 may be cut by the user himself or herself by operating the cutter 28.

In ACT 32, if it is determined that there is no linerless label paper 26, that is, it is determined that the linerless label paper 26 on which printing is completed is removed from the holding member 22, the print control unit 45 determines whether or not printing is performed on a predetermined number of linerless label paper 26 (ACT 35). If it is determined that printing is performed on a predetermined number of sheets of linerless label paper 26 (ACT 35: Yes), the label printer 40 ends the process of FIG. 11. On the other hand, if it is not determined that a predetermined number of sheets of the linerless label paper 26 are printed (ACT 35: No), the process proceeds to ACT 36.

If it is not determined in ACT 35 that printing is performed on a predetermined number of sheets of the linerless label paper 26, the print control unit 45 resumes printing (ACT 36).

The print control unit 45 increments the number of sheets of the linerless label paper 26 on which printing is completed (ACT 37). Then, the process returns to ACT 32.

Action and Effect of Embodiment

As described above, in the label printer 40 of the second embodiment, the light irradiation unit 41 and the light receiving unit 43 are installed at positions facing each other across the label surface of the linerless label paper 26 on which printing is completed. Therefore, as compared with the case of using the reflection type sensor, the amount of the external light 38 incident on the light receiving element 34 is reduced, and thus the influence of the external light 38 can be reduced.

In the first embodiment, it is described that the release sensor 23 is configured by using a reflection type sensor. Further, in the second embodiment, it is described that the label sensor 24 is configured by using a transmission type sensor. However, the release sensor 23 may be composed of a transmission type sensor, or the label sensor 24 may be composed of a reflection type sensor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer device, comprising:

a light irradiation component configured to irradiate with light an area illuminated by external light where a label on which printing is completed exists;

a light irradiation controller configured to switch between light irradiation and non-irradiation states by the light irradiation component;

a light receiving component configured to acquire an optical signal from the area where the label on which printing is completed exists in synchronization with light irradiation and non-irradiation by the light irradiation controller; and a label presence or absence determination component configured to determine the presence or absence of a label based on a first signal acquired by the light-receiving component if the light irradiation component is not emitting light and a second signal acquired by the light receiving component if the light irradiation component is emitting light, wherein the label presence or absence determination component further determines the presence or absence of the label based on a magnitude relationship between a difference value between a level of the first signal and a level of the second signal and a threshold value, wherein the label presence or absence determination component sets the threshold value based only on the level of the first signal, and wherein the label presence or absence determination component further sets the threshold value based on a comparison of the level of the first signal to a dataset comprising a set of specified first signal values and set of specified threshold values that respectively correspond to the set of specified first signal values.

2. The printer device according to claim 1, wherein the light irradiation component and the light receiving component are installed on a same side of a label surface of the label on which printing is completed.

3. The printer device according to claim 1, wherein the light irradiation component and the light receiving component are installed at positions facing each other across a label surface of the label on which printing is completed.

4. The printer device according to claim 1, further comprising:

a print controller configured to suspend printing of a next label on a condition that the label presence or absence determination component determines that the label is present, and start printing of the next label on a condition that the label presence or absence determination component determines that the label is absent.

5. The printer device according to claim 1, wherein the label presence or absence determination component is a release sensor.

6. The printer device according to claim 1, wherein the label presence or absence determination component further sets the threshold value based on an average value of plural levels of the first signal, including the level of the first signal.

7. The printer device according to claim 1, wherein the label presence or absence determination component further sets the threshold value based on a comparison of an average value of plural levels of the first signal, including the level of the first signal, to a dataset comprising a set of specified first signal values and set of specified threshold values that respectively correspond to the set of specified first signal values.

8. A method for a printer device, comprising:

irradiating with light an area illuminated by external light where a label on which printing is completed exists;

switching between light irradiation and non-irradiation states;

acquiring an optical signal from the area where the label on which printing is completed exists in synchronization with light irradiation and non-irradiation;

determining the presence or absence of a label based on a first signal acquired if not emitting light and a second signal acquired if emitting light;

further determining the presence or absence of the label based on a magnitude relationship between a difference value between a level of the first signal and a level of the second signal and a threshold value;

setting the threshold value based only on the level of the first signal, and setting the threshold value based on a comparison of the level of the first signal to a dataset comprising a set of specified first signal values and set of specified threshold values that respectively correspond to the set of specified first signal values.

9. The method according to claim 8, wherein irradiating with light and acquiring the optical signal are conducted on a same side of a label surface of the label on which printing is completed.

10. The method according to claim 8, wherein irradiating with light and acquiring the optical signal are performed at positions facing each other across a label surface of the label on which printing is completed.

11. The method according to claim 8, further comprising:

suspending printing of a next label on a condition of determining that the label is present; and starting printing of the next label on a condition of determining that the label is absent.

12. The method according to claim 8, further comprising: further setting the threshold value based on an average value of plural levels of the first signal, including the level of the first signal.

13. The method according to claim 8, further comprising: further setting the threshold value based on a comparison of an average value of plural levels of the first signal, including the level of the first signal, to a dataset comprising a set of specified first signal values and set of specified threshold values that respectively correspond to the set of specified first signal values.

14. A label printer device, comprising:

a thermal print head;

a light irradiation component configured to irradiate with light an area illuminated by external light where a label on which printing is completed exists;

a light irradiation controller configured to switch between light irradiation and non-irradiation states by the light irradiation component;

a light receiving component configured to acquire an optical signal from the area where the label on which printing is completed exists in synchronization with light irradiation and non-irradiation by the light irradiation controller; and a label presence or absence determination component configured to determine the presence or absence of a label based on a first signal acquired by the light-receiving component if the light irradiation component is not emitting light and a second signal acquired by the light receiving component if the light irradiation component is emitting light, wherein the label presence or absence determination component is further configured to determine the presence or absence of the label based on a magnitude relationship between a difference value between a level of the first signal and a level of the second signal and a threshold value, wherein the label presence or absence determination component is configured to set the threshold value based only on the level of the first signal, and wherein the label presence or absence determination component further sets the threshold value based a comparison of the level of the first signal to a dataset comprising a set of specified first signal values and set of specified threshold values that respectively correspond to the set of specified first signal values.

15. The label printer device according to claim 14, wherein the light irradiation component and the light receiving component are installed at positions facing each other across a label surface of the label on which printing is completed.

16. The label printer device according to claim 14, further comprising:

a print controller configured to suspend printing of a next label on a condition that the label presence or absence determination component determines that the label is present, and start printing of the next label on a condition that the label presence or absence determination component determines that the label is absent.

17. The label printer device according to claim 14, wherein the label presence or absence determination component is a release sensor.

18. The label printer device according to claim 14, wherein the label presence or absence determination component is further configured to set the threshold value based on an average value of plural levels of the first signal, including the level of the first signal.

19. The label printer device according to claim 14, the light irradiation component and the light receiving component are installed on a same side of a label surface of the label on which printing is completed.

20. The label printer device according to claim 14, wherein the label presence or absence determination component further sets the threshold value based on a comparison of an average value of plural levels of the first signal, including the level of the first signal, to a dataset comprising a set of specified first signal values and set of specified threshold values that respectively correspond to the set of specified first signal values.

* * * * *